US012731059B2

(12) United States Patent
Quiñones et al.

(10) Patent No.: US 12,731,059 B2
(45) Date of Patent: Sep. 8, 2026

(54) APPROXIMATION OF STATE VECTOR SPARSITY FOR EFFICIENT QUANTUM CIRCUIT KNITTING

(71) Applicant: Dell Products L.P., Round Rock, TX (US)

(72) Inventors: Miguel Paredes Quiñones, Campinas (BR); Rômulo Teixeira de Abreu Pinho, Niterói (BR); Micael Veríssimo de Araújo, Rio de Janeiro (BR); João Victor da Fonseca Pinto, Rio de Janeiro (BR); Alexander Eulalio Robles Robles, Valinhos (BR)

(73) Assignee: Dell Products L.P., Round Rock, TX (US)

( * ) Notice: Subject to any disclaimer, the term of this patent is extended or adjusted under 35 U.S.C. 154(b) by 699 days.

(21) Appl. No.: 18/186,253

(22) Filed: Mar. 20, 2023

(65) Prior Publication Data

US 2024/0320532 A1 Sep. 26, 2024

(51) Int. Cl.
*G06N 10/20* (2022.01)

(52) U.S. Cl.
CPC .................................... *G06N 10/20* (2022.01)

(58) Field of Classification Search
CPC ...................................................... G06N 10/00
See application file for complete search history.

(56) References Cited

PUBLICATIONS

Goswami, S., et al., Sparsity measure of a network graph: Gini index [received Jan. 21, 2026]. Retrieved from Internet :<https://www.sciencedirect.com/science/article/pii/S0020025518304158> (Year: 2018).*

Tang, W., et al., Cutting Quantum Circuits to Run on Quantum and Classical Platforms, [received Jan. 21, 2026]. Retrieved from Internet:<https://arxiv.org/abs/2205.05836> (Year: 2022).*

Tang, W., et al., ScaleQC: A Scalable Framework for Hybrid Computation on Quantum and Classical Processors, [received Jan. 21, 2026]. Retrieved from Internet :< https://arxiv.org/abs/2207.00933> (Year: 2022).*

You, J., et al., GraphRNN: Generating Realistic Graphs with Deep Auto-regressive Models, [received Jan. 21, 2026]. Retrieved from Internet: <https://proceedings.mlr.press/v80/you18a> (Year: 2018).*

Tang, Wei, et al. "CutQC: Using Small Quantum Computers for Large Quantum Circuit Evaluations." In Proceedings of the 26th ACM International Conference on Architectural Support for Programming Languages and Operating Systems, 473-86. Virtual USA: ACM, 2021. https://doi.org/10.1145/3445814.3446758.

* cited by examiner

*Primary Examiner* — Miranda M Huang
*Assistant Examiner* — Bart I Rylander
(74) *Attorney, Agent, or Firm* — Workman Nydegger

(57) ABSTRACT

Approximating state vector sparsity for quantum computing operations. A recurrent model is trained to predict sparsity indexes (sparsity vector) for a quantum circuit and its subcircuits. The computational requirements of a knitting operation can be estimated or predicted more efficiently using the predicted sparsity indexes. Cutting operations and decisions can also be based on the predicted sparsity indexes.

18 Claims, 7 Drawing Sheets

APPROXIMATION OF STATE VECTOR SPARSITY FOR EFFICIENT QUANTUM CIRCUIT KNITTING

FIELD OF THE INVENTION

Embodiments of the present invention generally relate to quantum computing and to quantum circuit cutting and knitting operations. More particularly, at least some embodiments of the invention relate to systems, hardware, software, computer-readable media, and methods for approximating state vector sparsity to facilitate quantum circuit knitting.

BACKGROUND

One of the problems in quantum computing is that quantum circuits may have more qubits than a target quantum computer can handle. For example, a 32 qubit quantum computer cannot execute a 64 qubit quantum circuit. To solve this problem, the original quantum circuit is cut into sub-circuits. The sub-circuits may be executed independently and the results of executing the sub-circuits are knitted together (e.g., using tensor networks, quasi-probability, or Kronecker product) to determine the results of the original quantum circuit. The knitted result corresponds to or may include an outcome state vector of the original quantum circuit.

The knitting operation, however, can consume significant computing resources. In fact, during a circuit cutting process, one objective function to be minimized is the computational cost of performing circuit knitting once the cuts are determined. A correct assessment of this objective function depends on the allocation of resources when circuit knitting is performed and on the correct decision of where cuts are made.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
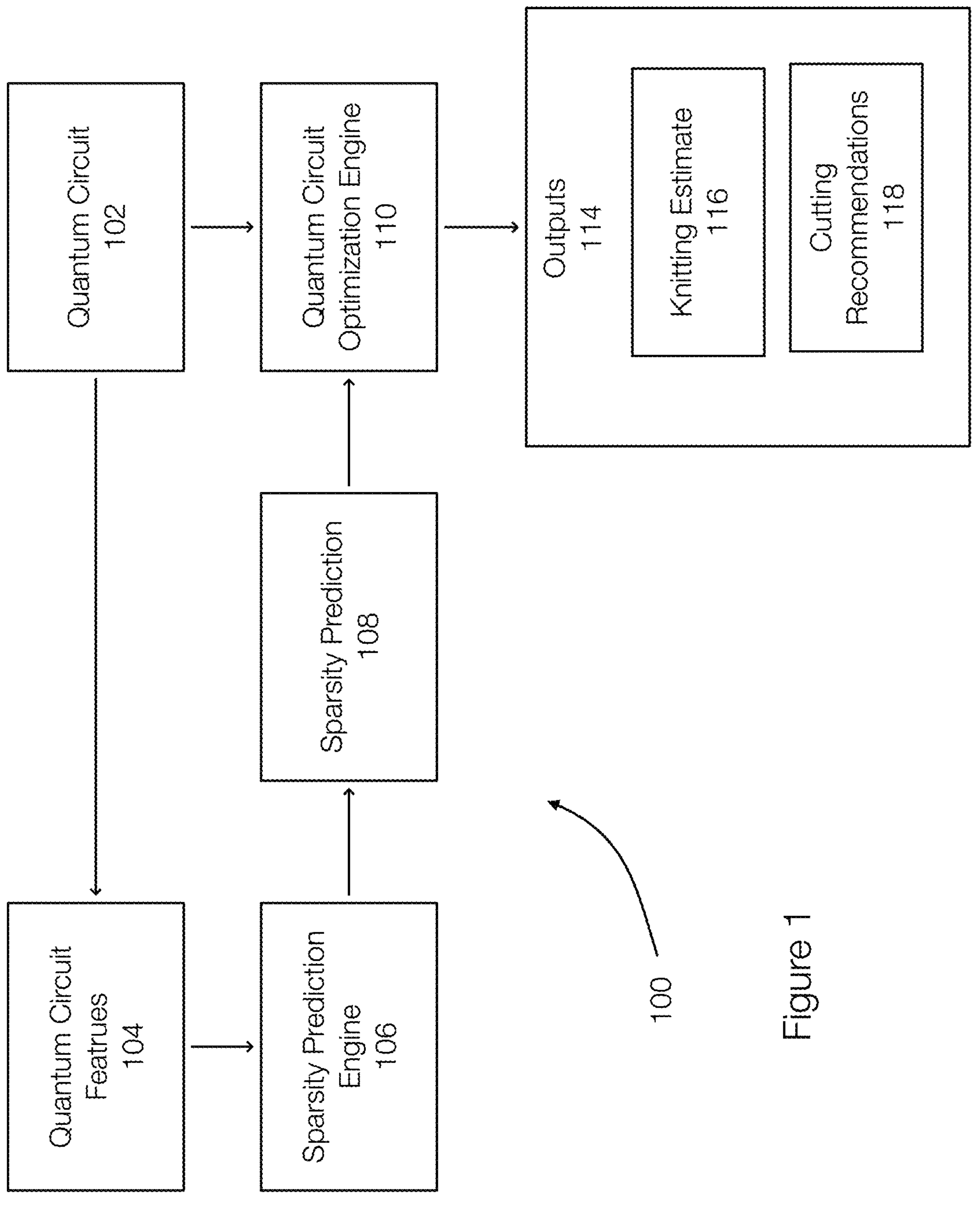
FIG. 1 discloses aspects of quantum computing operations including predicting a sparsity of a state vector and estimating aspects of performing a knitting operation.

Embodiments of the present invention generally relate to quantum computing. More particularly, at least some embodiments of the invention relate to systems, hardware, software, computer-readable media, and methods for approximating state vectors for evaluating a computation time of quantum knitting operations.

Embodiments of the invention more specifically relate to quantum computing operations such as cutting operations, knitting operations, and sparsity index approximation operations. More specifically, embodiments of the invention use sparsity estimation or approximation to influence or simplify the circuit cutting and/or circuit knitting operations.

Circuit cutting often occurs in the context of quantum computers (e.g., Noisy Intermediate Scale Quantum Computers—NISQ) that have a small number of qubits available for computation and can only process circuits with limited depth.

In order to run a large circuit on a quantum computer with fewer qubits and shallower supported depth that required, it may be necessary to perform a combinatorial optimization problem to cut the quantum circuits. The optimization problem has the following objective function:

$$L_c = 4^k \sum_{c=2}^{n_c} \prod_{i=1}^{c} 2^{f_i}$$

In this example, k is the number of cuts, $n_c$ is the number of subcircuits and $f_i$ is the number of qubits in every subcircuit acted upon in the knitting operations. The objective function represents the computational overhead of knitting the subcircuits produced during the circuit cutting operation. Because $f_i$ represents the total number of qubits that will participate in the final state vector, then $2^{f_i}$ represents the total number of possible states that need to be multiplied to obtain the final knitted results. This objective function assumes that a regular Kronecker product will be performed on the circuit knitting operation. However, if the sparsity of subcircuit outputs is known or approximated, other techniques may be used when multiplying sparse vectors. This allows the computational requirements of a knitting operation to be estimated more accurately and efficiently.

The sparsity of a circuit is defined as a coefficient between the non-zero outputs and the total outputs. This is reflected by:

$$s = 1 - \frac{\#\text{non zero elements}}{2^{\#\,qubits}}$$

The total number of elements at an output of a circuit can be calculated as an exponential function of the number of qubits on the circuit: $2^{\#qubits}$. Every element of the output represents the probability of occurrence of a state (i.e., a bitstring of possible output qubit values). Various quantum algorithms (e.g., Grover algorithm, QAOA) may compare possible solutions with the entire search space. Those solutions must have high probability compared to the other solutions. This produces very sparse outputs because only a few elements have high probability.

From a circuit knitting perspective, knowing the sparsity of the output of subcircuits is important because a Full Definition (FD) algorithm, combined with a heuristic called early termination, performs a Kronecker product and checks if some entries are zero in order to not multiply these entries. The FD algorithm is described in Tang, Wei, Teague Tomesh, Martin Suchara, Jeffrey Larson, and Margaret Martonosi. "CutQC: Using Small Quantum Computers for Large Quantum Circuit Evaluations." In *Proceedings of the 26th ACM International Conference on Architectural Support for Programming Languages and Operating Systems,* 473-86. Virtual USA: ACM, 2021. https://doi.org/10.1145/3445814.3446758, which is incorporated by reference. This technique also sorts the Kronecker product according to this zero-checking criterion to be more efficient.

Embodiments of the invention note that the output of many quantum circuits is sparse, where most values in the output state vector are zero. The computation overhead of circuit knitting can be reduced for subcircuits whose state vectors are sparse. In other words, if the sparsity of the state vectors can be predicted, the computation overhead can be estimated or predicted in advance.

Consequently, it may be useful to favor configurations or to perform cutting operations that yield this subcircuits with sparse state vectors. Embodiments of the invention thus relate to predicting the sparsity of state vectors, which may also influence both cutting and knitting operations.

Using a model to predict the sparsity of state vectors allows the computational burden of circuit knitting operations to be estimated more efficiently. Embodiments of the invention may use a recurrent model to predict the sparsity index $s_{i,c}$ for every subcircuit i of an original circuit c, wherein i is also the number of qubits of the total circuit c as a function of key variables in $I_{i,c}$. $I_{i,c}$ is a feature vector that contains a number of total CNOT gates that connects qubit i with other qubits, the number of types of 1-qubit gates on the current qubit i, and the like.

One benefit of using a sequential (or recurrent) model compared to a single regression model to predict the sparsity of the last output of a quantum circuit is that the sparsity for intermediary subcircuits is also known or can be predicted.

FIG. 1 discloses aspects of quantum operations including cutting, knitting and cutting/knitting related operations. FIG. 1 illustrates a quantum circuit 102 to be executed on a target quantum computer. However, the target quantum computer may not be able to accommodate the number of qubits/depth of the quantum circuit 102. Thus, the quantum circuit 102 may need to be cut. Quantum circuits may be cut for other reasons.

Embodiments of the invention relate to optimizing operations related to cutting the circuit into subcircuits and knitting the results of executing the subcircuits together. As previously stated, cutting operations may be performed or determined in a manner that accounts for the subsequent knitting operation. More particularly, the cutting operation tries to account for the computational time that will be required by the knitting operation.

Embodiments of the invention improve the processes of estimating the computation time required to knit the results of the subcircuits together using a sparsity prediction engine 106.

More specifically, quantum circuit features 104 may be extracted from the quantum circuit 102. The features may include the total number of CNOTs that connect qubit i with other qubits, the number of types of 1-qubit gates on a current qubit i, and the like. These features may be provided to or input to the sparsity prediction engine 106. The sparsity prediction engine 106 generates a sparsity prediction 108.

The quantum circuit optimization engine 110 may receive the quantum circuit 102 and the sparsity prediction 108 as input. The sparsity prediction 108 may include the predicted sparsity indexes of the quantum circuit and/or subcircuits thereof. The engine 110 then generates outputs 114, which may include cutting recommendations 118 (e.g., how to cut the quantum circuit 102) and/or a knitting estimate 116, which is an estimate of computation time required to knit outputs of the subcircuits together. By having the predicted sparsity indexes available, the computation time required to knit the outputs of the subcircuits can be estimated better. The system 100 may then cut the quantum circuit 102 into subcircuits, execute the subcircuit 102 by executing the subcircuits separately, and knitting the results (e.g., state vectors) of the subcircuits together to obtain a final result, which may include a final state vector for the original quantum circuit.

Figure 2:
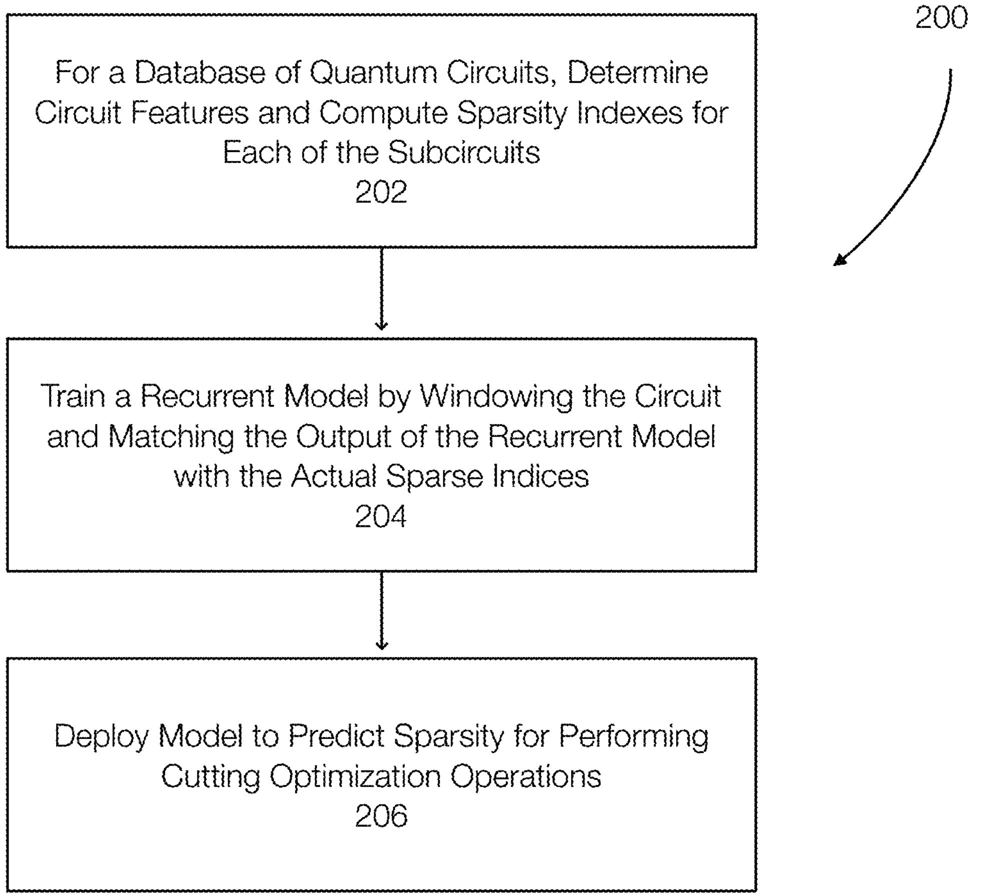
FIG. 2 discloses aspects of predicting a sparsity index of a quantum circuit to optimize a cutting operation and/or a knitting operation.

FIG. 2 discloses aspects of predicting the sparsity (e.g., the sparsity index) of quantum circuits. In particular, FIG. 2 illustrates aspects of training a model such as may be included in the sparsity prediction engine 106. In the method 200, a database of quantum circuits is accessed and at least some of the quantum circuits may be used for training purposes. Circuit features ($I_{i,c}$) are determined 202 for the quantum circuits (and subcircuits thereof) in the database selected for training a model. For each quantum circuit c, the quantum circuit is executed or run and a sparsity index is determined. Sparsity indexes ($s_{i,c}$) are also determined of the state vector of each subcircuit i of the quantum circuit c.

Next, a recurrent model (e.g., a model included in the sparsity prediction engine 106) is trained 204 using the circuit features and the sparsity indexes obtained in 202. More specifically, a circuit is windowed to obtain subcircuits with one qubit, then two qubits, and so on up to the number of qubits of the original circuit. The output of the recurrent model is then matched with the true sparse indices generated at 202 using mean squared error as a training cost function in one example.

The recurrent model, once trained, may be deployed 206 to predict sparsity indexes for cutting optimization operations. During a cutting operation, the recurrent model is used to predict the sparsity index $s_{i,c}$ for every subcircuit i of a quantum circuit c.

The predicted sparsity index can be used as an objective term of the cutting optimization problem to obtain more accurate estimates of the computational overhead of circuit knitting, by accounting for sparsity. The sparsity indexes may also be used to optimize the Kronecker product of subcircuits. For example, the sparsity index of each subcircuit of a final solution could be used to sort them in descending order of sparsity so that their state vectors may be more efficiently multiplied by the circuit knitting, which may use Full Definition operation.

Embodiments of the invention thus relate to a recurrent model configured to predict sparsity indexes for quantum circuits and subcircuits thereof. During knitting operations, the Kronecker product can consume substantial computation during reconstruction of the original quantum circuit's output and embodiments of the invention allow a more accurate representation of the computational overhead to be determined.

Predicting sparsity allows the cutting/knitting operations to be improved. The recurrent model, which is configured to predict the sparsity index of a circuit, uses characteristics of the circuit as input.

Figure 3:
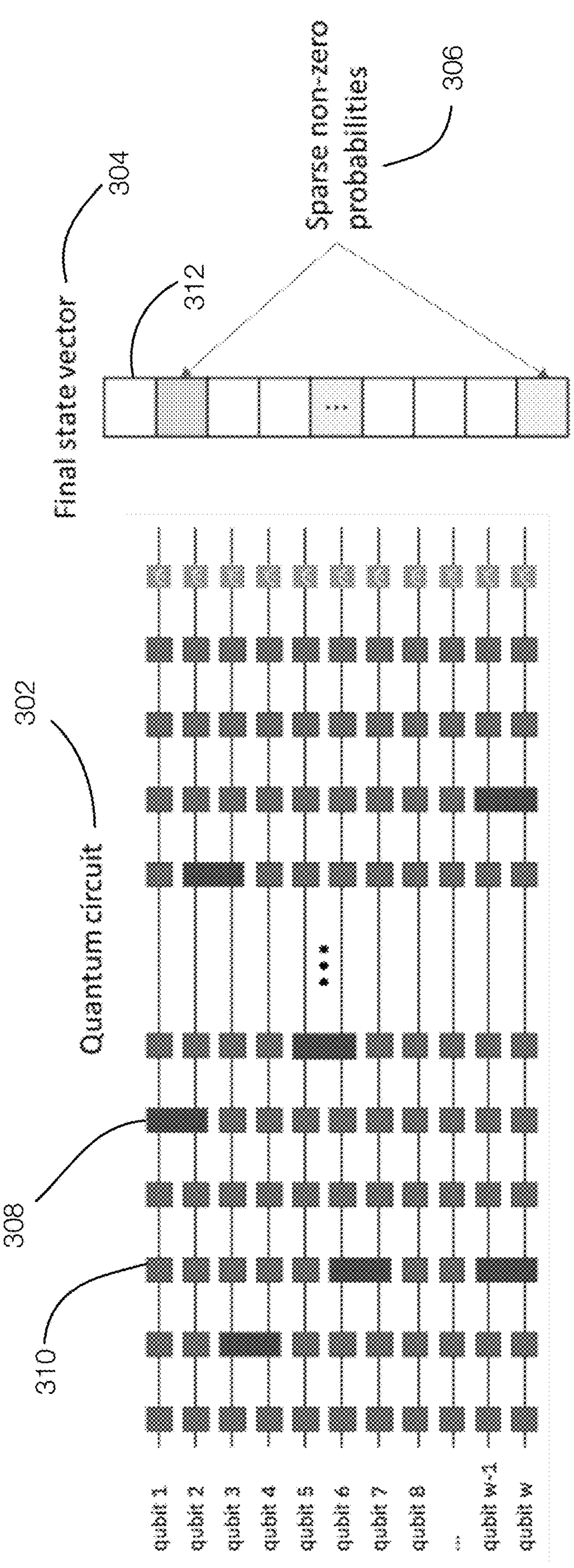
FIG. 3 discloses aspects of a quantum circuit and a final state vector that includes non-zero probabilities.

FIG. 3 discloses aspects of a final state vector of quantum circuits. FIG. 3 illustrates an example of a quantum circuit 302. The quantum circuit 302 includes w qubits. In the circuit 302, gates 310 may operate on the various qubits during execution of the circuit 302. Some of the gates, such as the gate 308, may involve more than one qubit. A CNOT gate is an example of a gate that involves more than one qubit. The gates 308 often generate entangled qubits or states.

The output of the quantum circuit 302 is represented by a final state vector 304. The final state vector 304 may be sparse. Some of the entries in the final state vector 304 are non-zero entries 306 or non-zero probabilities. The other entries, such as the entry 312, in one example, are zero or may be treated as zero depending on the probability.

Figure 4:
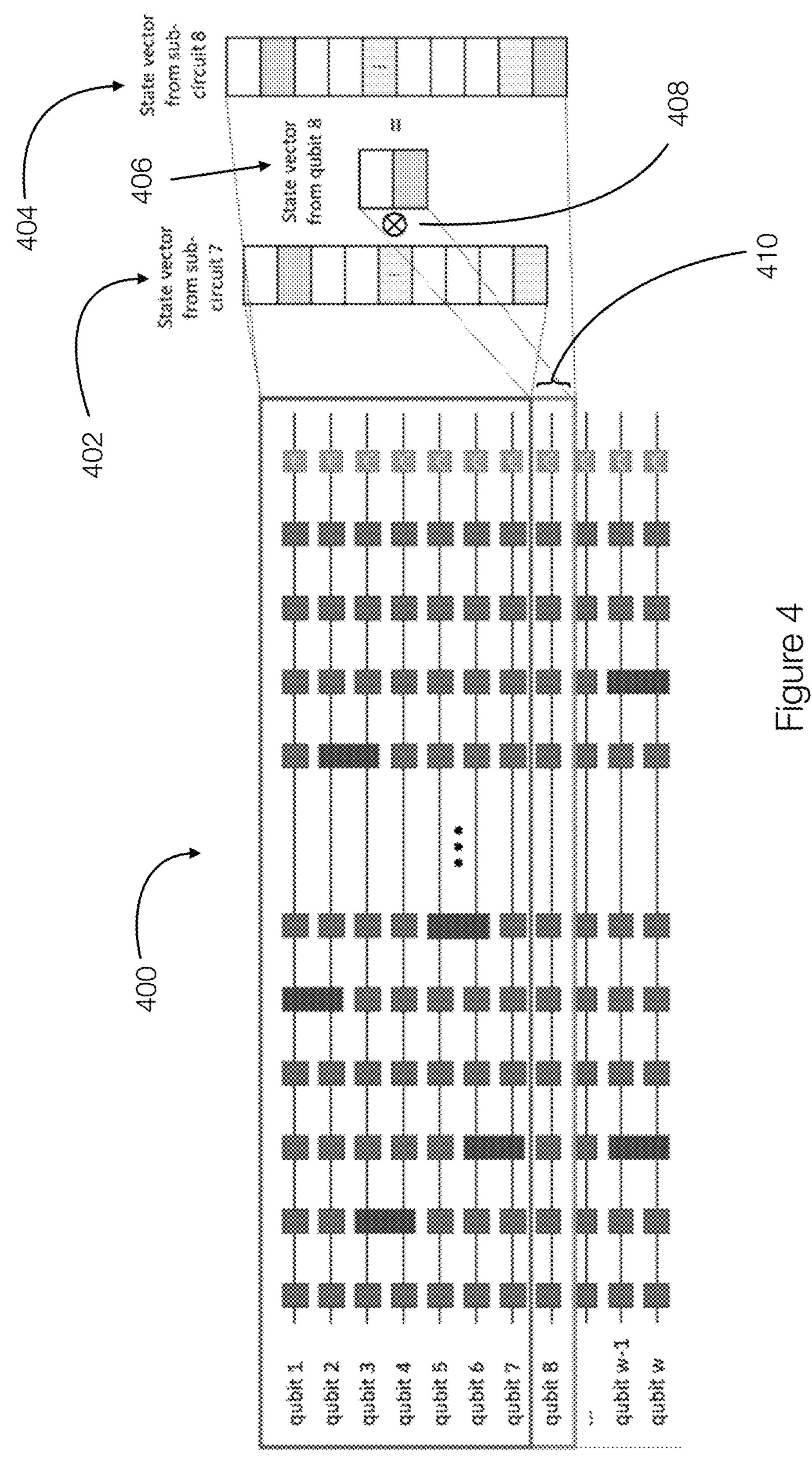
FIG. 4 discloses aspects of a relationship between sparsity indexes of related quantum sub-circuits.

FIG. 4 discloses aspects of state vector dependence between subcircuits of a quantum circuit. FIG. 4 illustrates a quantum circuit 400. The circuit 400 may include w subcircuits and includes w qubits. In the circuit 400, the first subcircuit includes qubit 1, the second subcircuit includes qubits 1 and 2, the third subcircuit includes qubits 1-3, and so on. FIG. 4 highlights subcircuits i and (i+1). In this specific example, i=7. Thus, the state vector 402 corresponds the sub-circuit 7 and the state vector 404 corresponds to the sub-circuit 8.

FIG. 4 illustrates that there is a recurrence relationship between a subcircuit with i qubits and the next subcircuit with (i+1) qubits. The recurrence stems from the fact that the state vector of subcircuit (i+1) is obtained using a Kronecker product between the state from vector from the subcircuit i and the two states corresponding to the additional qubit (i+1). For example, the state vector 404 of subcircuit 8 may be obtained by the Kronecker product 408 of the state vector 402 and the state vector 410 from qubit 8. The sparsity (or sparsity index) of circuit (i+1) depends on the sparsity or sparsity index of the previous circuit i.

Figure 5:
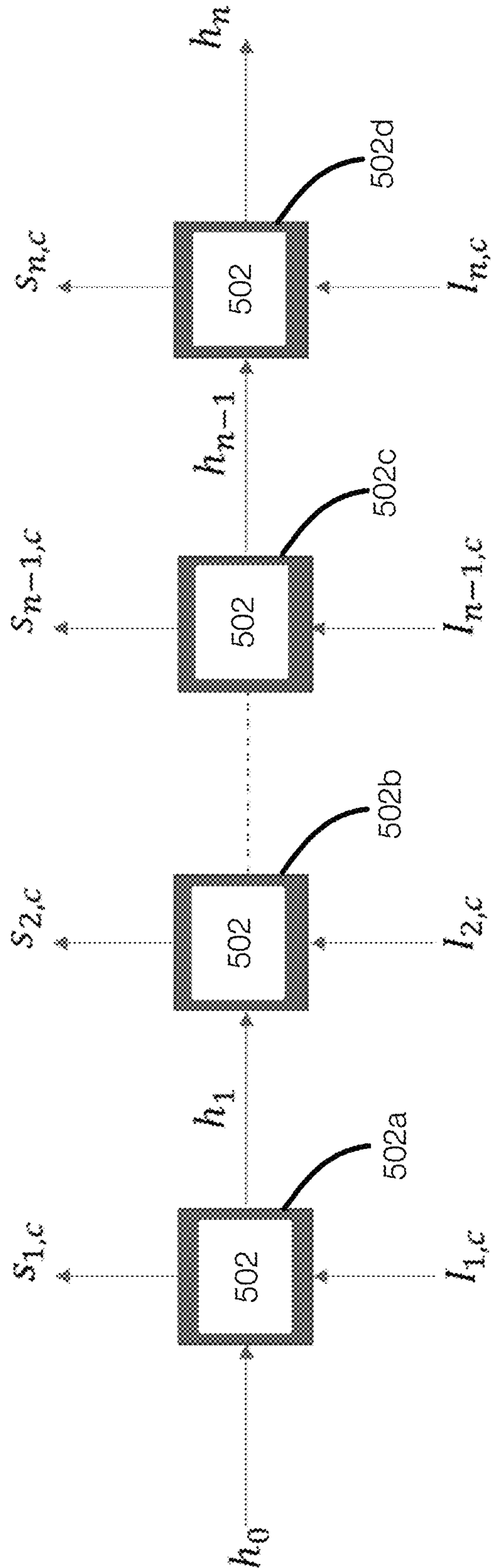
FIG. 5 discloses aspects of a model configured to predict a sparsity index for a quantum circuit.

FIG. 5 discloses aspects of a recurrent model configured to predict the sparsity index of each subcircuit i of a quantum circuit c. The recurrent model 502 (an example of a sparsity prediction engine 106) is used recurrently and is referenced at different stages as the model units 502*a*, 502*b*, 502*c*, and 502*d*.

The model 502 is trained to predict the value of a sparsity index $s_{i,c}$ at every subcircuit i, with i qubits, of circuit c. As illustrated in FIG. 5, the model 502 generally receives, as input, feature variables $I_{i,c}$ of the corresponding subcircuit and a hidden state $h_{i-1}$, which may be generated from a previous iteration or recurrence.

In this example h is a real vector with a pre-defined dimensions. Predicting $s_{i,c}$ is equivalent to learning a shared function $f(h_{i-1}, I_{i,c})$. Each unit transforms the hidden state into $h_{i+1}$, as a learnable shared function $g(h_i, I_{i,c})$ before passing it to the next unit. This allows information about the sparsity of subcircuit i to be carried into subcircuit (i+1). In this example, $h_0$ is arbitrarily set to 0.

In FIG. 5, the unit 502*a* corresponds to the first subcircuit i=1. Thus, the input to the unit 502*a* includes the hidden state $h_0$ and the feature variables for the first subcircuit $I_{1,c}$. The output of the unit 502*a* may include a predicted sparsity index $s_{1,c}$ and $h_1$. The second unit 502*b*, for the subcircuit i=2, receives the hidden state $h_1$ and the feature variables for the second subcircuit $I_{2,c}$. The output of the unit 502*b* includes a predicted sparsity index $s_{2,c}$.

The unit 502*c* receives, as input, the hidden state $h_{n-2}$ and the features $I_{n-1,c}$ and outputs the sparsity index $s_{n-1,c}$. The last unit 502*d* receives, as input, the hidden state $h_{n-1}$ and features $I_{n,c}$. The unit 502*d* outputs the predicted sparsity index $s_{n,c}$ for the quantum circuit c and the state $h_n$.

The recurrent model 502 can be used in stages to generate the sparsity index of each subcircuit of a quantum circuit. In one example, multiple instances or units of the recurrent model may be chained or the same instance may be used repeatedly.

As previously described, the model 402 may be trained over a large collection of circuits C. Each circuit c in the circuits C is split into subcircuits $[1, n_c]$ where $n_c$ is the total number of qubits of c. For each subcircuit i of c, with i qubits, the following data is collected:

- Number of CNOT gates that connect qubit i with other qubits;
- Number of types of 1-qubit gates on current qubit i; and
- Number of qubits of the current subcircuit i, which is equal to i.

These values are assembled into a tuple $I_{i,c}$. In addition, each subcircuit i of c is executed so that the true sparsity index of its output can be determined.

In one example, a predefined number of model units (e.g., 502*a*, 502*b*, . . . , 502*c*, 502*d*) is set for the model 502. The training process is performed by rolling a window of size M over the circuit's qubits and feeding the respective $I_{i,c}$ entries to the model. The M units generate M outputs, corresponding to sparsity estimates. The estimated or predicted sparsity indexes are compares with the true sparsity indexes collected during execution of the subcircuits. The model learns the correct parameters of approximation output by taking the sum of squared errors or other error metrics between the sparsity estimates and the true sparsity values.

After the model is trained, the sparsity index estimates for each subcircuit configuration i of a new circuit c can be predicted. Each subcircuit is a candidate in the cutting process and the corresponding sparsity index can be used in the objective function to correct the computational overhead of circuit knitting. The predicted sparsity index $s_i$ of a candidate subcircuit can be used as a weighting factor of the expected cost of knitting the subcircuit as follows:

$$L_c = 4^k \sum_{c=2}^{n_c} \prod_{i=1}^{c} s_i \times 2^{f_i}$$

In this example, the objective function is non-linear. A Monte Carlo tree search or branch and bound algorithms may be suitable for solving problems with highly nonlinear objective functions.

Figure 6:
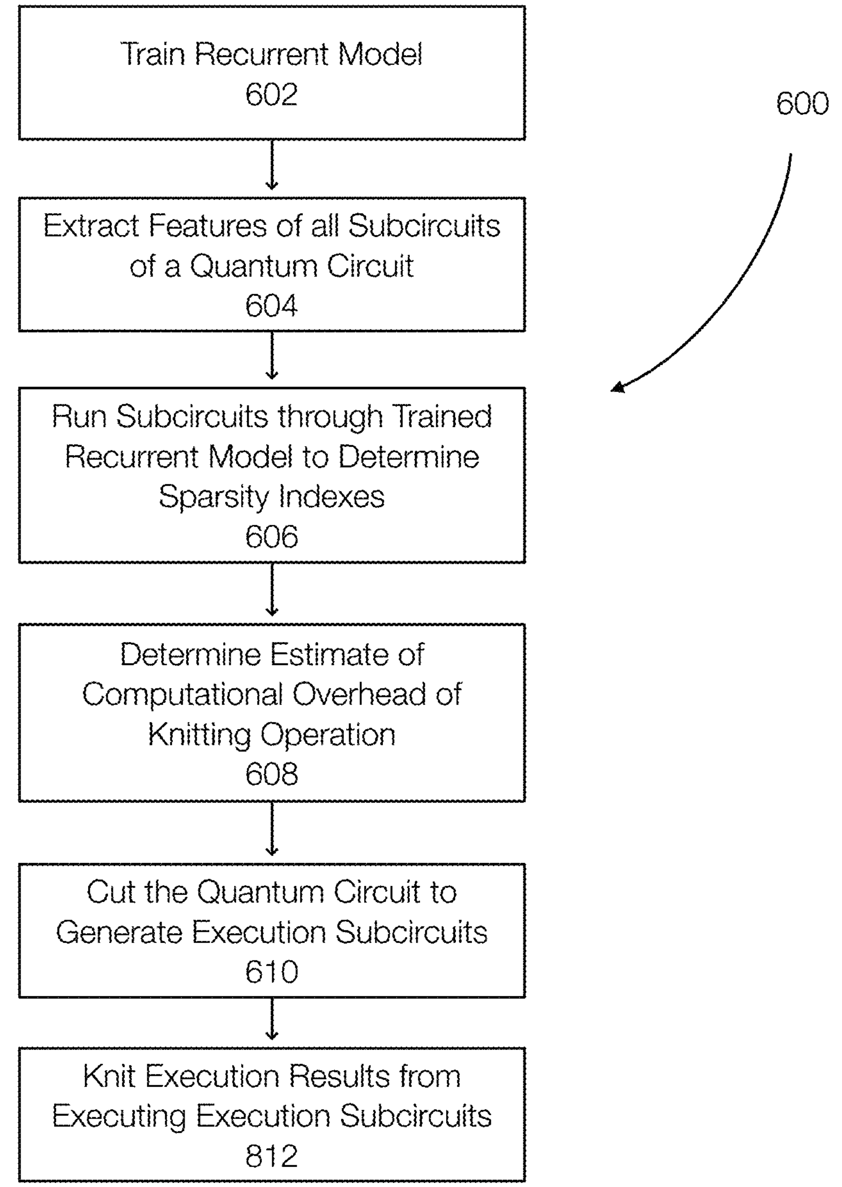
FIG. 6 discloses aspects of estimating the computational overhead of a knitting operation and/or performing cutting/knitting operations on a quantum circuit.

FIG. 6 discloses aspects of predicting a sparsity index and of performing cutting and/or knitting operations. Elements or aspects of the method 600 may be performed less frequently than other aspects of the method 600. For example, the method 600 includes training 602 the recurrent model. However, training is not performed each time the method 600 is performed. In one example, the method 600 may represent different methods, such as training the model and then running or deploying a trained model.

Once deployed, the method 600 may include extracting 604 features of a quantum circuit. This may be performed for a quantum circuit as a whole and all of its subcircuits. The subcircuits are input 606 to the trained recurrent model and sparsity indexes are determined 606 for each of the subcircuits and for the quantum circuit as a whole.

Using the sparsity indexes predicted by the trained recurrent model, an estimate of computation overhead of the knitting operation is determined 608. This may also be based on a proposed circuit cuts. Next, the quantum circuit is cut 610 to generate execution subcircuits. After the subcircuits are executed, the execution results are knitted 812 together. Knitting may generate an actual state vector for the quantum circuit.

Embodiments of the invention predict state vectors. These predictions may influence cutting decisions, which in turn impact knitting operations. Embodiments may advantageously reduce the time required to cut, execute, and knit quantum circuits.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, quantum circuit operations, cutting operations, knitting operations, computation time estimation operations, state vector prediction operations, or the like or combination thereof. More generally, the scope of the invention embraces any operating environment in which the disclosed concepts may be useful.

Particularly, devices in the operating environment may take the form of software, physical machines, containers, or VMs, or any combination of these, though no particular device implementation or configuration is required for any embodiment.

It is noted with respect to the disclosed methods herein and in the Figures, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A method comprising: extracting features from a quantum circuit and subcircuits of the quantum circuit, running the features through a recurrent model to predict a sparsity index for each of the subcircuits and for the quantum circuit, and determining an estimate of a computational overhead of a knitting operation based on the predicted sparsity indexes.

Embodiment 2. The method of embodiment 1, further comprising cutting the quantum circuit based on the sparsity indexes to generate cut circuits.

Embodiment 3. The method of embodiment 1 and/or 2, further comprising knitting outputs of the cut circuits together.

Embodiment 4. The method of embodiment 1, 2, and/or 3, wherein the quantum circuit includes w qubits and wherein the subcircuits of the quantum circuit include a subcircuit i that includes i qubits from i=1 to i=w.

Embodiment 5. The method of embodiment 1, 2, 3, and/or 4, further comprising training the recurrent model using a database of quantum circuits using features extracted from the quantum circuits and using sparse indexes generated by running the quantum circuits.

Embodiment 6. The method of embodiment 1, 2, 3, 4, and/or 5, wherein running the features through the recurrent model includes running features of a first subcircuit through a first unit to predict a first sparsity index and a first hidden state.

Embodiment 7. The method of embodiment 1, 2, 3, 4, 5, and/or 6, further comprising inputting features of a second subcircuit and a first hidden state into a second unit to predict a second sparsity index of the second subcircuit and a second hidden state, wherein corresponding units predict sparsity indexes for the subcircuits of the quantum circuit.

Embodiment 8. The method of embodiment 1, 2, 3, 4, 5, 6, and/or 7, wherein the features include a number of CNOT gates that connect a qubit with other qubits, a number of types of 1-qubit gates for a current qubit, and number of qubits of a current subcircuit.

Embodiment 9. The method of embodiment 1, 2, 3, 4, 5, 6, 7, and/or 8, further comprising estimating or correcting an estimate of computational overhead based on:

$$L_c = 4^k \sum_{c=2}^{n_c} \prod_{i=1}^{c} s_i \times 2^{f_i}$$

wherein k is a number of cuts, $n_c$ is a number of subcircuits, $f_i$ is a n umber of qubits in every subcircuit acted upon during knitting, and $s_i$ is a predicted sparsity index.

Embodiment 10. The method of embodiment 1, 2, 3, 4, 5, 6, 7, 8, and/or 9, further comprising sorting the subcircuits based on the sparsity indexes to simplify multiplication.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods/operations disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, agent, client, or the like may refer to software objects or routines that execute on the computing system. The different components, modules, engines, clients, agents, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
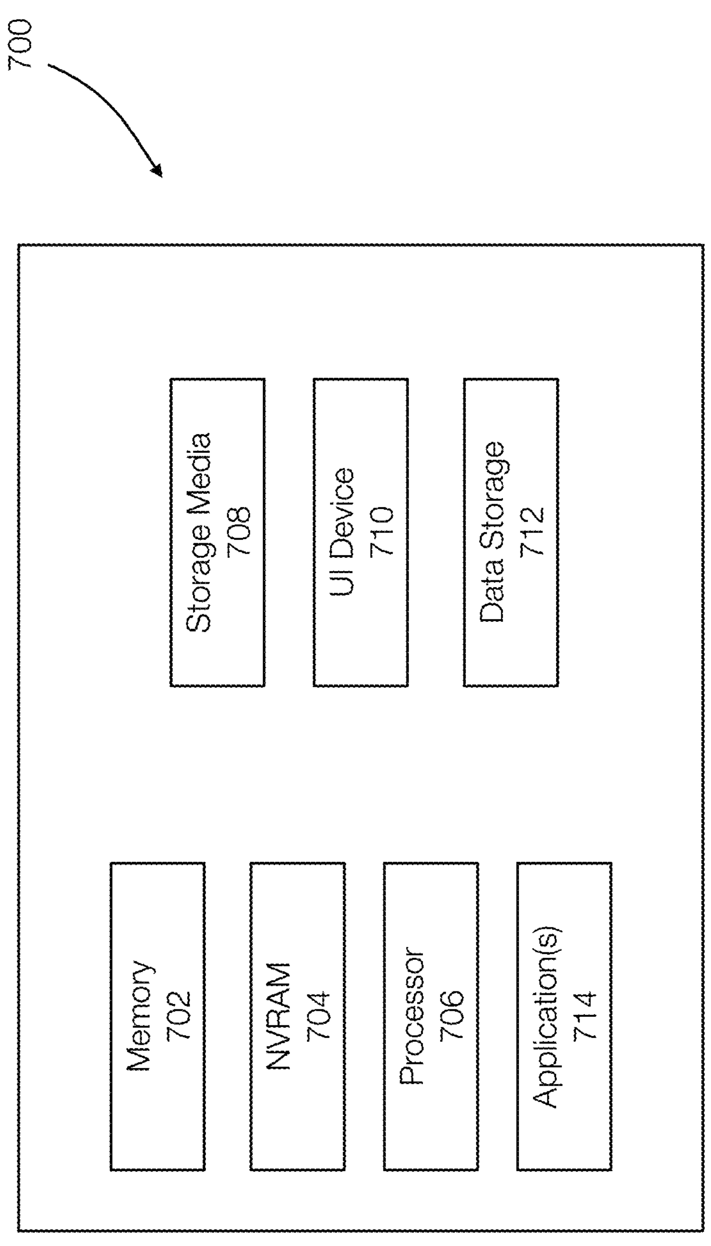
FIG. 7 discloses aspects of a computing device, system, or entity.

With reference briefly now to FIG. 7, any one or more of the entities disclosed, or implied, by the Figures and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid-state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The device 700 may also represent a group of devices or servers, an edge-based system, a cloud based system, or the like or combinations thereof.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

extracting features from a quantum circuit and subcircuits of the quantum circuit;

running the features through a recurrent model to predict a sparsity index for each of the subcircuits and for the quantum circuit; and determining an estimate of a computational overhead of a knitting operation based on the predicted sparsity indexes;

cutting the quantum circuit based on the sparsity indexes to generate cut circuits; and knitting output of the cut circuits together.

2. The method of claim 1, wherein the estimate of the computational overhead is used to control at least one of a cutting operation of the quantum circuit into subcircuits or an execution order of knitting operations for the subcircuits.

3. The method of claim 1, wherein the quantum circuit includes w qubits and wherein the subcircuits of the quantum circuit include a subcircuit i that includes i qubits from i=1 to i=w.

4. The method of claim 1, further comprising training the recurrent model using a database of quantum circuits, wherein training includes: generating training feature vectors for subcircuits of each quantum circuit in the database; executing the subcircuits to determine corresponding sparsity indexes; and adjusting parameters of the recurrent model based on a comparison between predicted sparsity indexes and the corresponding sparsity indexes.

5. The method of claim 1, wherein running the features through the recurrent model includes running features of a first subcircuit through a first unit to predict a first sparsity index and a first hidden state.

6. The method of claim 5, further comprising inputting features of a second subcircuit and a first hidden state into a second unit to predict a second sparsity index of the second subcircuit and a second hidden state, wherein corresponding units predict sparsity indexes for the subcircuits of the quantum circuit.

7. The method of claim 1, wherein the features include a number of CNOT gates that connect a qubit with other qubits, a number of types of 1-qubit gates for a current qubit, and number of qubits of a current subcircuit.

8. The method of claim 1, further comprising estimating or correcting an estimate of computational overhead based on:

$$L_c = 4^k \sum_{c=2}^{n_c} \prod_{i=1}^{c} s_i \times 2^{f_i}$$

wherein k is a number of cuts, $n_c$ is a number of subcircuits, $f_i$ is a number of qubits in every subcircuit acted upon during knitting, and $s_i$ is a predicted sparsity index.

9. The method of claim 1, further comprising sorting the subcircuits based on the sparsity indexes to simplify multiplication.

10. A non-transitory storage medium having stored therein instructions that are executable by one or more hardware processors to perform operations comprising:

extracting features from a quantum circuit and subcircuits of the quantum circuit;

running the features through a recurrent model to predict a sparsity index for each of the subcircuits and for the quantum circuit; and determining an estimate of a computational overhead of a knitting operation based on the predicted sparsity indexes;

cutting the quantum circuit based on the sparsity indexes to generate cut circuits; and knitting output of the cut circuits together.

11. The non-transitory storage medium of claim 10, wherein the estimate of the computational overhead is used to control at least one of a cutting operation of the quantum circuit into subcircuits or an execution order of knitting operations for the subcircuits.

12. The non-transitory storage medium of claim 10, wherein the quantum circuit includes w qubits and wherein the subcircuits of the quantum circuit include a subcircuit i that includes i qubits from i=1 to i=w.

13. The non-transitory storage medium of claim 10, further comprising training the recurrent model using a database of quantum circuits, wherein training includes: generating training feature vectors for subcircuits of each quantum circuit in the database;

executing the subcircuits to determine corresponding sparsity indexes; and adjusting parameters of the recurrent model based on a comparison between predicted sparsity indexes and the corresponding sparsity indexes.

14. The non-transitory storage medium of claim 10, wherein running the features through the recurrent model includes running features of a first subcircuit through a first unit to predict a first sparsity index and a first hidden state.

15. The non-transitory storage medium of claim 14, further comprising inputting features of a second subcircuit and a first hidden state into a second unit to predict a second sparsity index of the second subcircuit and a second hidden state, wherein corresponding units predict sparsity indexes for the subcircuits of the quantum circuit.

16. The non-transitory storage medium of claim 10, wherein the features include a number of CNOT gates that connect a qubit with other qubits, a number of types of 1-qubit gates for a current qubit, and number of qubits of a current subcircuit.

17. The non-transitory storage medium of claim 10, further comprising estimating or correcting an estimate of computational overhead based on:

$$L_c = 4^k \sum_{c=2}^{n_c} \prod_{i=1}^{c} s_i \times 2^{f_i}$$

wherein k is a number of cuts, $n_c$ is a number of subcircuits, $f_i$ is a number of qubits in every subcircuit acted upon during knitting, and $s_i$ is a predicted sparsity index.

18. The non-transitory storage medium of claim 10, further comprising sorting the subcircuits based on the sparsity indexes to simplify multiplication.

* * * * *